F. P. HANSON.
STONE SAW.
APPLICATION FILED DEC. 31, 1908.
947,969.
Patented Feb. 1, 1910.
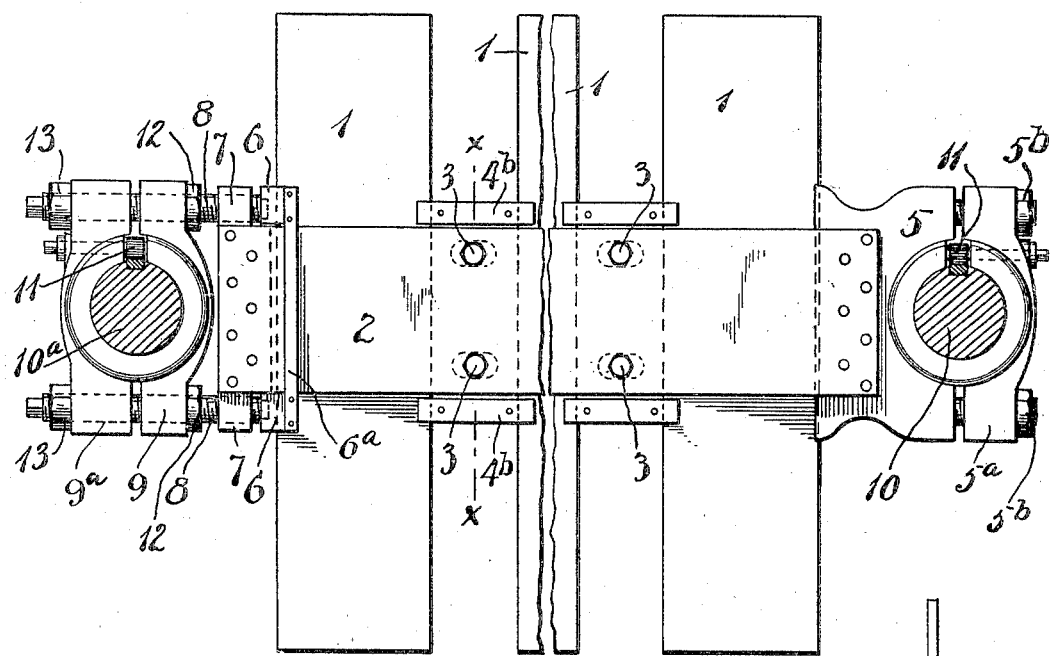
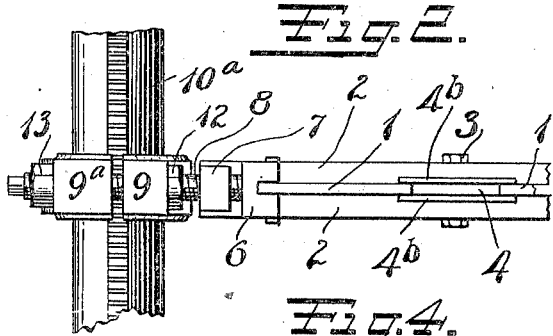
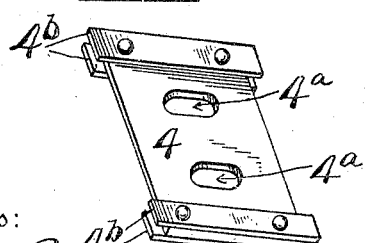
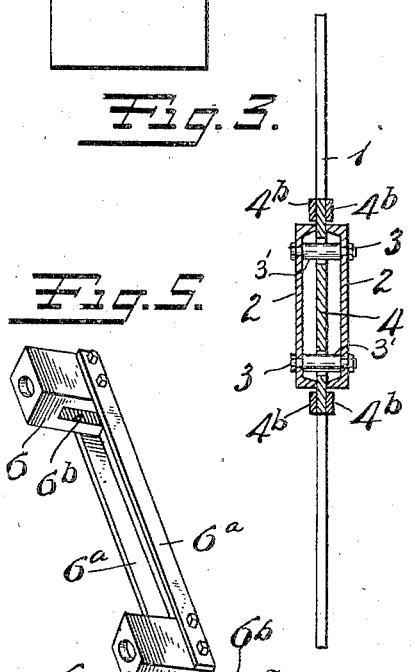
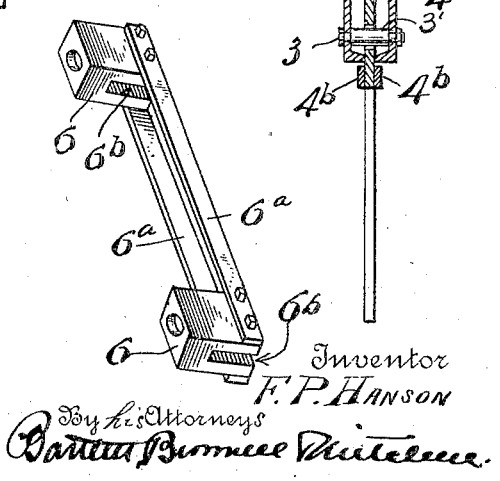
Witnesses:
Chas. A. Peard
Fred M. Dannenfelser
Inventor
F. P. Hanson
By his Attorneys
Bartlett Brownell Mitchell

UNITED STATES PATENT OFFICE.

FRED P. HANSON, OF SAN FRANCISCO, CALIFORNIA, ASSIGNOR TO THE UNITED STATES STONE SAW COMPANY, OF TUCSON, ARIZONA TERRITORY, A CORPORATION OF ARIZONA TERRITORY.

STONE-SAW.

947,969.   Specification of Letters Patent.   Patented Feb. 1, 1910.

Application filed December 31, 1908. Serial No. 470,191.

*To all whom it may concern:*

Be it known that I, FRED P. HANSON, a citizen of the United States, residing at San Francisco, California, have invented certain new and useful Improvements in Stone-Saws, of which the following is a full, clear, and exact description.

My invention relates to improvements in stone sawing machines and the like, and particularly to a means for holding the blades and for adjusting the same independently or collectively. It is essentially an improvement upon the subject-matter of my companion application Serial No. 470,192, filed Dec. 31st, 1908, and is especially adapted for sawing hard cutting stone, where large and heavy saw construction is required; whereas in the former case the apparatus is best adapted for light work.

In the drawings, Figure 1 is a side elevation of such portions of a stone saw as are needed for the purpose of understanding my invention. Fig. 2 is a plan view of a portion of the saw shown in Fig. 1. Fig. 3 is a section on the plane of the line $x$—$x$, Fig. 1. Figs. 4 and 5 are perspective views of different details of construction.

1—1—1 are saw blades arranged parallel with each other and in a vertical position, their lower edges being in alinement. These blades 1—1 are held between companion saw beams 2—2, the latter being clamped together by through-bolts 3—3, which carry spacing thimbles or sleeves 3'—3' arranged to hold the saw beams apart for a purpose to be described. These through bolts 3—3 do not pass through the saw-blades 1, but instead pass through spacing devices.

Each spacing device comprises the body 4 having enlarged bolt passages $4^a$ therein, and having the ribs or flanges $4^b$—$4^b$ preferably at both the upper and lower edge thereof, these flanges being spaced apart suitably to stand above and below the saw beams, as best seen in Fig. 1. These flanges likewise project beyond the side edges of the body 4, thereby forming pockets to receive the edges of the saw-blades, as best seen in Fig. 2. The end-blades, in the present case, bear at one end against a head 5 at one end of the saw beam and at the other end against an adjustable clamping member 6 carried by the head proper at the opposite end of the saw beam.

Adjacent to the clamp 6 and rigidly secured between companion saw beams 2—2 is an abutment 7, 8—8 are screws passing through screw-threaded passages in abutment 7, the forward ends of said screws being provided with non-threaded noses arranged to engage with the rear side of the clamp 6. The member 6 has side ribs $6^a$, which connect the two end pieces thereof, each end piece corresponding in shape and being provided with a recess $6^b$ to receive the edge of the adjacent blade. The screws 8 not only pass through the abutment 7 but they also pass loosely through the two head blocks 9—$9^a$ constituting a head adjustable on an end bar $10^a$ of the frame. The head 5 is also adjustable upon a frame bar 10.

As in my companion application referred to, the bars 10—$10^a$ are each provided with a rack or equivalent means for engagement by a pinion 11 or the like, whereby the saw beams may be adjusted laterally relatively to their own position upon the frames 10—$10^a$.

12—13 are clamping nuts on the screws 8—8 by which the head blocks 9—$9^a$ may be locked upon the frame $10^a$ when properly adjusted thereon.

The head 5 is provided with a cap $5^a$, which, by means of bolts $5^b$, may be clamped upon the end bar 10 after the desired adjustment has been effected.

From the foregoing it will be seen that when the parts are loosened up, any of the blades may be adjusted vertically to the desired position. When this adjustment has been effected, the operator may set up on the screws 8—8. These screws in drawing through the ends of the abutment 7, press the clamping member 6 forward, forcing the series of blades to the right (as viewed in Fig. 1) until they are securely clamped by an edgewise engagement with the spacing devices 4 and the head 5. The setting up of the bolts 3 draws the companion saw beams into contact with the intermediate thimbles 3' so as to correctly aline the spacing devices 4 and prevent lateral displacement. The operator may then by turning the pinion aforesaid, shift the heads to the desired position upon the frames 10—$10^a$. When this position has been attained, the nuts 12—13 may be set up, in the one instance clamping the members 9—$9^a$ upon the frame 10ᵃ, and the bolts 5ᵇ may finally be set up, clamping the head 5 securely upon the frame 10.

It will be understood, of course, that the frame end bars 10—10ᵃ are connected at their ends in any suitable manner customary in saw frames of this character, so as to make a solid reciprocable frame which may be moved to and fro in a direction to cause the blades to reciprocate edgewise over the stone. Since the construction of the frame of which the members 10ᵃ form a part is immaterial to this invention, I have not deemed it necessary to illustrate the same herein.

As will be seen, the adjustment of the saw blades may be very quickly and easily effected, either severally or collectively and this adjustment is unlimited in its direction.

What I claim is—

1. In a stone saw, a pair of companion saw-beams, a pair of frame end-bars, means for connecting said saw-beams to said end-bars, including heads adjustable on said end-bars, and means carried by one of said heads and operating longitudinally relatively to said saw-beams for locking saw-blades therein.

2. In a stone saw, blades, companion saw-beams, end-bars arranged to support said saw-beams, means for shifting said saw-beams on said end-bars including a slidable head on each end-bar, one of said heads being directly connected to said saw-beams, the other head being indirectly connected to said saw-beams, said indirect connection including a saw-blade clamping device.

3. In a stone saw, companion saw-beams, saw-blades arranged between the same, a saw-blade spacer comprising a body member, ribs at one end of said body member arranged to rest upon said saw-beams and to partially embrace the adjacent saw-blades, and means for clamping said companion saw-beams toward each other and rigidly engage said spacers and blades.

4. In a stone saw, a pair of companion saw beams saw blades arranged between them, saw blade spacing devices, a saw blade clamping member at one end of said companion saw beams, and comprising an abutment carried by said saw-beams, a clamping block also carried by said saw-beams and arranged between said abutment and the adjacent saw-blade, and means carried by said abutment coöperating with said clamping block for operating the latter.

5. In a stone saw, a pair of companion saw beams saw blades arranged between them, saw blade spacing devices, a saw blade clamping member at one end of said companion saw beams, and comprising an abutment carried by said saw-beams, a clamping block also carried by said saw-beams and arranged between said abutment and the adjacent saw-blade, and means carried by said abutment coöperating with said clamping block for operating the latter, said clamping block operating means comprising a screw.

FRED P. HANSON.

Witnesses:
ROBERTSON T. McKISICK,
HENRY W. ARNOLD.